United States Patent
Xu et al.

(10) Patent No.: US 10,412,023 B2
(45) Date of Patent: Sep. 10, 2019

(54) RESOURCE ALLOCATION METHOD UNDER HETEROGENEOUS NETWORK UNDER INTERMEDIATE PROCESSING CONSTRAINTS

(71) Applicant: Tsinghua University, Beijing (CN)

(72) Inventors: Ke Xu, Beijing (CN); Tong Li, Beijing (CN); Xin Liu, Beijing (CN); Meng Shen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 20 days.

(21) Appl. No.: 15/771,946

(22) PCT Filed: Nov. 7, 2016

(86) PCT No.: PCT/CN2016/104947
§ 371 (c)(1),
(2) Date: Apr. 27, 2018

(87) PCT Pub. No.: WO2017/088638
PCT Pub. Date: Jun. 1, 2017

(65) Prior Publication Data
US 2018/0316625 A1    Nov. 1, 2018

(30) Foreign Application Priority Data

Nov. 24, 2015  (CN) .......................... 2015 1 0822590

(51) Int. Cl.
*H04L 12/927* (2013.01)
*H04L 12/751* (2013.01)
(Continued)

(52) U.S. Cl.
CPC ............ *H04L 47/801* (2013.01); *H04L 41/12* (2013.01); *H04L 43/0852* (2013.01); *H04L 45/02* (2013.01); *H04L 45/126* (2013.01); *H04L 47/564* (2013.01); *H04L 41/5019* (2013.01); *H04L 47/786* (2013.01)

(58) Field of Classification Search
None
See application file for complete search history.

(56) References Cited

U.S. PATENT DOCUMENTS

2015/0382275 A1* 12/2015 Pragada ................ H04W 40/12
                                                                370/236

* cited by examiner

*Primary Examiner* — Christine T Duong
(74) *Attorney, Agent, or Firm* — Hodgson Russ LLP (57) ABSTRACT

The present disclosure provides a resource allocation method of a heterogeneous network under intermediate processing constraints. The method includes: generating a preference list for each intermediate node; obtaining network topology information of the heterogeneous network, and calculating a transmission path length of the data stream passing through the intermediate node according to the network topology information; obtaining a quasi-service list of each intermediate node; obtaining a mapping relationship between the intermediate nodes and the data flows according to the quasi-service list of each intermediate node, and sequentially scheduling the data flows according to the mapping relationship and the preference list of each intermediate node. A device for resource allocation of a heterogeneous network under intermediate processing constraints and a non-transitory computer storage medium are also disclosed.

19 Claims, 4 Drawing Sheets

(51) Int. Cl.
*H04L 12/733* (2013.01)
*H04L 12/875* (2013.01)
*H04L 12/26* (2006.01)
*H04L 12/24* (2006.01)
*H04L 12/915* (2013.01)

RESOURCE ALLOCATION METHOD UNDER HETEROGENEOUS NETWORK UNDER INTERMEDIATE PROCESSING CONSTRAINTS

CROSS-REFERENCE TO RELATED APPLICATIONS

This application is a U.S. national phase application of International Application No. PCT/CN2016/104947, filed Nov. 7, 2016, which claims priority to Chinese Patent Application Serial No. 201510822590.0, filed with the State Intellectual Property Office of P. R. China on Nov. 24, 2015, the entire contents of which are incorporated herein by reference.

FIELD

The present disclosure relates to a technology field of network resource management, and more particularly to a resource allocation method of a heterogeneous network under intermediate processing constraints.

BACKGROUND

Real-time big data application in a heterogeneous network is generally based on analysis and processing of massive sensor data, and a decision is made according to system feedback. Conventionally, raw data is directly uploaded to a server without being processed, thus resulting in low efficiency, greatly wasting network resource, and even causing network congestion, service failure. Therefore, one feasible way is to make full use of processing abilities of network nodes, in which the raw data is first processed by the nodes and then the processed result is transmitted to the server. However, due to factors such as capability anisotropy, stage treatment, and load balancing in the heterogeneous network, more and more specific workflows require to be processed (such as, clipping, format conversion, and noise removal processing) at a certain intermediate node on a path from the source node to the destination node, that is, intermediate processing constraint. The intermediate processing node (intermediate node for short) is generally a machine which is dedicated, has high performance, and has sufficient resource (such as, CPU, GPU and memory).

On the other hand, a soft real-time application includes multiple data flows. Since the data flows have interdependence (some flows need to be processed after other flows have been processed), the expected completion time of respective flows may be different, i.e., the data flows have different deadlines. Moreover, for the soft real-time application, its flow is still valid even if it misses the deadline. Based on this, optimizing the latency of the soft real-time application refers to minimizing a total delay of all flows.

The conventional solutions either merely focus on routing optimization, seeking a shortest transmission path to reduce transmission delay, or merely focus on scheduling flows, to reduce queueing time of flows at the processing node. Since the completion time of the flows depends on the routing delay, the queueing time and the processing time, any optimization from a single perspective cannot realize global optimal allocation of system resource. Thus, the global optimization requires considering both perspectives of routing and scheduling. The routing is how to allocate the intermediate nodes to the flows, and the scheduling is to decide which flows are preferentially processed.

SUMMARY

The present disclosure aims to solve at least one problem in the related art to at least some extent.

To this end, the first objective of the present disclosure is to provide a resource allocation method of a heterogeneous network under intermediate processing constraints, which performs joint optimization from two perspectives of routing and scheduling, so as to minimize latency of data intensive application under intermediate processing constraints, achieving optimal resource allocation and optimal network performance.

The second objective of the present disclosure is to provide a device.

The third objective of the present disclosure is to provide a non-transitory computer storage medium.

In order to achieve the above objectives, embodiments of the first aspect of the present disclosure provide a resource allocation method of a heterogeneous network under intermediate processing constraints. The method includes: S1: obtaining a deadline and a required resource amount of each data flow, setting a corresponding evaluation score for each data flow according to the deadline and the required resource amount of the data flow, and ranking the data flows according to the evaluation scores, to generate a preference list for each intermediate node; S2: obtaining network topology information of the heterogeneous network, and calculating a length of a transmission path of the data flow passing through the intermediate node according to the network topology information; S3: initializing a service quota of each intermediate node to be 1, and performing a bidirectional matching between the data flows and the intermediate nodes, to obtain a quasi-service list of each intermediate node; S4: obtaining a mapping relationship between the intermediate nodes and the data flows according to the quasi-service list of each intermediate node, and sequentially scheduling the data flows according to the mapping relationship and the preference list of each intermediate node.

In additional, the resource allocation method of a heterogeneous network under intermediate processing constraints according to above embodiment of the present disclosure may further have following additional features.

In some examples, S2 includes: calculating a shortest path length between the source node of each data flow and the intermediate node and a shortest path length between the intermediate node and the destination node of each data flow according to the network topology information; and obtaining the length of the transmission path of each data flow according to the shortest path length between its source node and the intermediate node and the shortest path length between the intermediate node and its destination node.

In some examples, the length of the transmission path via an intermediate node is equal to a sum of the shortest path length between source node and the intermediate node and the shortest path length between the intermediate node and destination node.

In some examples, S3 includes: S31: ranking the intermediate nodes, to generate a preference list for each data flow; S32: submitting a request by each data flow to the first intermediate node in the preference list thereof; and S33: each intermediate node determining whether the number of data flows apply to the intermediate node exceeds the service quota of the intermediate node. If yes, rejecting the applications of the data flows beyond the service quota according to the preference list of the intermediate node, adding the data flows within the service quota into the quasi-service list, and adding one to the service quota of the intermediate node.

In some examples, after S33, the method further includes S34: if all the data flows are in a certain quasi-service list of the intermediate nodes, executing S4, otherwise, executing S31.

In some examples, S33 further includes: if the intermediate node determines that the number of data flows applying to the intermediate node does not exceed the service quota of the intermediate node, directly adding the data flows into the quasi-service list of the intermediate node.

In some examples, S31 includes: S311: calculating an expected handling time of each data flow at each intermediate node according to the preference list of each intermediate node and the current quasi-process list of each intermediate node; S312: setting an evaluation score for each intermediate node according to the expected handling time and the lengths of transmission paths of data flows through the intermediate node, and ranking the intermediate nodes according to the evaluation scores, to generate the preference list for each data flow.

In some examples, S311 includes: S3111: determining whether there is data flow in the quasi-process list of the intermediate node; S3112: if a data flow is not in the quasi-process list of the intermediate node, add the data flow into the quasi-process list of the intermediate node; S3113: obtaining a scheduling order of the data flow at the intermediate node according to the preference list of the intermediate node, and calculating a processing time and an expected queueing time of the data flow, and obtaining the expected handling time of the data flow according to the processing time and expected queueing time of the data flow.

In some examples, the expected handling time of the data flow is a sum of the processing time and the expected queueing time of the data flow.

With the resource allocation method of a heterogeneous network under intermediate processing constraints according to embodiments of the present disclosure, based on the classical matching theory, by using the iterative mechanism increasing quota gradually, and according to mutual preference of flows and intermediate nodes, a bidirectional matching frame between flows and intermediate nodes is proposed, to achieve refusing of routing and scheduling. That is, a joint optimization is performed from two perspectives of scheduling and routing, to minimize tardiness of data intensive application, thus realizing low delay and high performance of the data intensive application under intermediate processing constraints, and achieving optimal resource allocation and optimal network performance. In addition, the present disclosure can be applied to a wide range of scenarios, such as smart city, smart factory, and cloud data center, and thus has a wide applicability.

In order to achieve above objectives, embodiments of the second aspect of the present disclosure provide a device. The device includes: one or more processors; a memory; one or more programs, stored in the memory, and configured to perform the resource allocation method of a heterogeneous network under intermediate processing constraints according to above embodiments of the present disclosure when executed by the one or more processor.

In order to achieve above objectives, embodiments of the third aspect of the present disclosure provide a non-transitory computer storage medium, stored therein with one or more programs that, when executed by a device, causes the device to perform the resource allocation method of a heterogeneous network under intermediate processing constraints according to above embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings as described below, in which.

EMBODIMENTS OF THE PRESENT DISCLOSURE

The present disclosure will be further described in detail below with reference to the accompanying drawings and embodiments. Same or similar reference numbers throughout the specification indicate same or similar elements or element having same or similar functions. It should be understood that the specific embodiments described herein are only used to explain the present disclosure, and should not be understood as limitation to the present disclosure.

In the following, a resource allocation method of a heterogeneous network under intermediate processing constraints according to embodiments of the present disclosure will be described in detail with reference to drawings.

First, the main principle of the present disclosure is: under the intermediate processing constraints, achieving the joint optimization from two perspectives of routing and scheduling by performing a bidirectional matching between flows and intermediate nodes. With respect to the situation in which multiple data flows compete for multiple intermediate nodes, each data flow selects its preferable intermediate nodes according to its preference. Moreover, the service capability of the intermediate node is limited, and thus each intermediate has its own service quota, and selects the data flows within its service quota according to its preference. After iterations, a mapping relationship between the flows and the intermediate nodes is obtained. Then, the intermediate node sequentially schedules the data flows which need to be processed at itself according to its preference. The selection of the intermediate node decides the routing delay and the processing time, and the scheduling sequence of the flows decides the queueing time.

Figure 1:
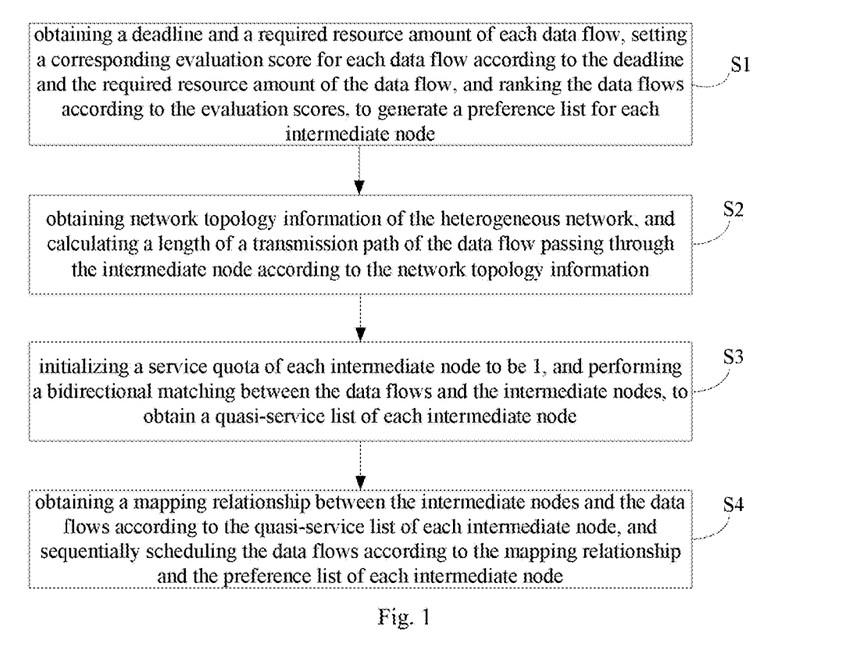
FIG. 1 is a flowchart of a resource allocation method of a heterogeneous network under intermediate processing constraints according to an embodiment of the present disclosure.

FIG. 1 is a flow chart of a resource allocation method of a heterogeneous network under intermediate processing constraints according to an embodiment of the present disclosure. As illustrated in FIG. 1, the method includes following steps.

At step S1, a deadline and a required resource amount of each data flow is obtained, an evaluation score is set for each data flow according to the deadline and the required resource amount of the data flow, and the data flows are ranked according to the evaluation scores, to generate a preference list for each intermediate node. The evaluation score is a normalized weighted sum.

At step S2, network topology information of the heterogeneous network is obtained, and a transmission path length of the data flow passing through the intermediate node is calculated according to the network topology information.

In an embodiment of the present disclosure, for example, step S2 includes followings.

At step S21, with respect to all the data flows and the intermediate nodes, a shortest path length between the source node of each data flow and the intermediate node and a shortest path length between the intermediate node and the destination node of each data flow are calculated according to network topology information.

At step S22, the transmission path length of the data flow passing through the intermediate node is obtained according to the shortest path length between source node the data flow and the intermediate node and the shortest path length between the intermediate node and destination node of the data flow. More specifically, the transmission path length of the intermediate node is equal to a sum of the shortest path length between source nodes of all the data flows and the intermediate node and the shortest path length between the intermediate node and destination nodes of all the data flows.

At step S3, the service quota of each intermediate node is initialized to 1, and a bidirectional matching is performed between the data flows and the intermediate nodes, to obtain a quasi-service list for each intermediate node.

In an embodiment of the present disclosure, step S3 includes followings.

At step S31, the intermediate nodes are ranked, to generate a preference list for each data flow. This step for example includes followings.

At step S311, an expected handling time of each data flow at each intermediate node is calculated according to the preference list of each intermediate node obtained at step S1 and according to a current quasi-process list of each intermediate node, in which the current quasi-processing list of each intermediate node is initialized to zero. This step for example includes followings.

At step S3111, with respect to each intermediate node, it is determined whether a data flow exists in the quasi-process list of the intermediate node.

At step S3112, if a data flow does not exist in the quasi-process list of the intermediate node, the data flow is temporally added into the quasi-process list of the intermediate node.

At step S3113, a scheduling order of the data flow at the intermediate node is obtained according to the preference list of the intermediate node obtained at step S1, and a processing time and an expected queueing time of the data flow is calculated, and the expected handling time of the data flow is obtained according to the processing time and expected queueing time of the data flow. More specifically, the expected handling time of the data flow is a sum of the processing time and the expected queueing time of the data flow.

At step S312, an evaluation score is set for each intermediate node according to the expected handling time of the data flow at the intermediate node and the transmission path length of data flow through the intermediate node, and the intermediate nodes are ranked according to the evaluation scores, to generate the preference list for each data flow. This evaluation score is a normalized weighted sum.

At step S32, based on the preference list of each data flow obtained at step S312, each data flow applies to the first intermediate node in the preference list thereof.

At step S33, each intermediate node determines whether the number of data flows applying to the intermediate node exceeds a service quota of the intermediate node, if yes, rejects the applications of the data flows beyond the service quota according to the preference list of the intermediate node, adds the data flows within the service quota into the quasi-service list, and adds one to the service quota of the intermediate node. Further, if the intermediate node determines that the number of data flows applying to the intermediate node does not exceed the service quota of the intermediate node, it directly adds the data flows into the quasi-service list of the intermediate node.

Further, after step S33, the method for example further includes followings.

At step S34, if all the data flows are in the quasi-service lists of the intermediate nodes, subsequent S4 is executed. Otherwise, it returns to execute step S31.

At step S4, a mapping relationship between the intermediate nodes and the data flows is obtained according to the quasi-service list of each intermediate node, and in each intermediate node, the data flows are sequentially scheduled according to the mapping relationship and the preference list of the intermediate node obtained at step S1.

Therefore, the method according to embodiments of the present disclosure propose a bidirectional matching frame between flows and intermediate nodes based on the classical matching theory, by using the iterative mechanism increasing quota gradually, and according to mutual preference of flows and intermediate nodes, so as to achieve synergy of routing and scheduling, thus achieving a purpose of low delay and high performance of the data intensive application under intermediate processing constraints.

For ease of understanding, in the following, the method according to above embodiments of the present disclosure is further described in detail with specific examples and with reference to FIGS. 2-8.

Figure 2:
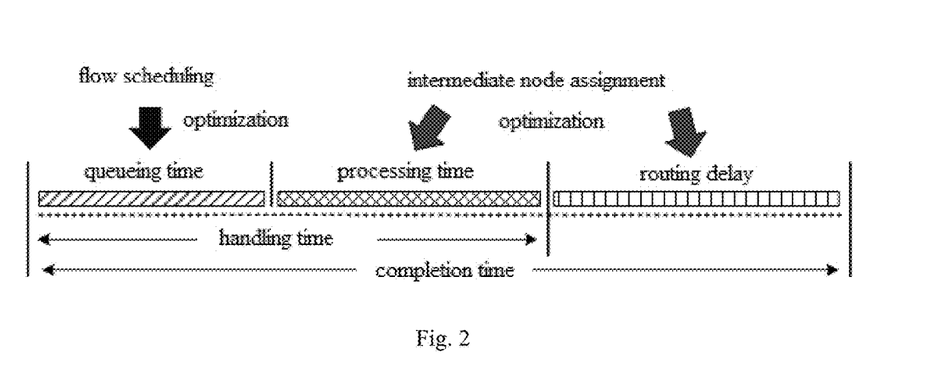
FIG. 2 is a schematic diagram illustrating components of a completion time of a data flow according to an embodiment of the present disclosure.
Figure 3:
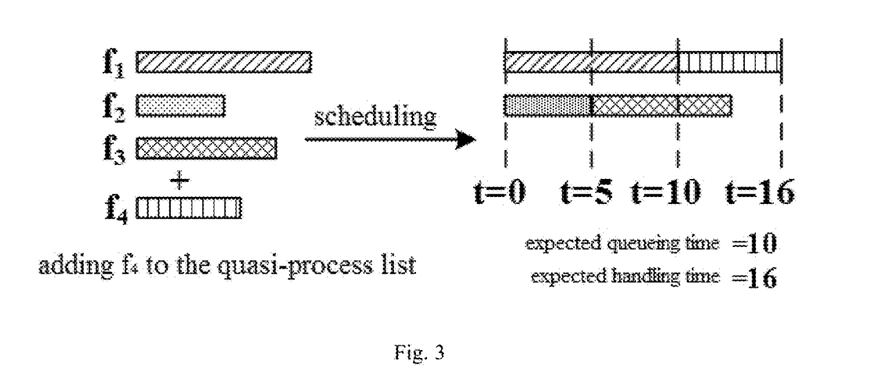
FIG. 3 is a schematic diagram illustrating calculating an expected handling time of a data flow according to an embodiment of the present disclosure.

Referring to FIG. 2, the completion time of the data flow is a sum of the handling time and the routing delay, in which, the handling time includes two parts which are the queueing time of the data flow at the node and the processing time, and the routing delay is equal to, through the intermediate node, the transmission delay of the path between the source node to the destination node. Assuming that the intermediate nodes are heterogeneous, and the data rates thereof are different, it is easy to know that the processing time and the routing delay depend on the selection of the intermediate node, and the queueing time depends on the scheduling strategy of the data flow at the intermediate node. However, it is difficult to reduce queueing time while reducing the processing time and the routing delay. For example, with respect to the data flow, if it is processed at the node with higher performance, a shorter processing time may be achieved, but its transmission path may be very long. Moreover, for achieving a shortest route, node on the shortest path of the data flow is generally chosen; however, if this node is overloaded and needs to provide service for more data flows, then the queueing time at the node may be very long.

For example, M represents a collection of all data flows, and K represents a collection of all intermediate nodes. $C_m$ represents the completion time of the data flow m(m∈M), $d_m$ represents the deadline of the data flow, then the tardiness of the data flow m is represented as $T_m = \max\{0, C_m - d_m\}$. Embodiments of the present disclosure minimizes the total tardiness of all the data flows, i.e., $$\sum_{m \in M} T_m,$$

under intermediate processing constraints. Thus, the method according to embodiments of the present disclosure performs the joint optimization from two perspectives of data flow scheduling and routing, specifically, solves how to allocate the intermediate node to the data flow and which data flows should be given priority to process, for minimizing the total tardiness of all the data flows.

Regarding the allocation of the intermediate nodes, embodiments of the present disclosure employs the method of performing bidirectional matching between the data flows and the intermediate nodes, and realizes the allocation scheme of the intermediate nodes close to optimum by iterations. For example, $A_m$ is defined to represent a preference list of the data flow m when selecting the intermediate node (elements of $A_m$ belong to the collection K), and $B_k$ is defined to represent a preference list of the intermediate node k(k∈K) when selecting the data flow (elements of $B_k$ belong to the collection M).

When the data flow selects the intermediate node, a normalized variable $\theta_l$ is defined for measuring an evaluation score of the data transmission path length $l_{mk}$ (m∈M, k∈K) of the data flow passing through the intermediate node, in which $\theta_l$ is inversely proportional to $l_{mk}$. Similarly, a normalized variable $\theta_e$ is defined for measuring an evaluation score of the expected handling time $h_{mk}$ of the data flow, in which $\theta_e$ is inversely proportional to $h_{mk}$. The preference list $A_m$ is obtained by ranking the intermediate nodes in descending order according to $\theta_l + \theta_e$. Since the expected handling time of the data flow depends on interaction of data flows in the queue, the preference list $A_m$ is dynamically updated in each iteration of the matching.

When the intermediate node selects the data flow, a normalized variable $\theta_d$ is defined for estimating the deadline $d_m$ of the data flow, in which $\theta_d$ is inversely proportional to $d_m$. Similarly, a normalized variable $\theta_q$ is defined for estimating an evaluation score of resource demand $q_m$ of the data flow, in which $\theta_q$ is inversely proportional to $q_m$. The preference list $B_k$ is obtained by ranking the data flows in descending order according to $\theta_d + \theta_q$.

Since the handling time of the data flow depends on the queueing time and the processing time of the data flow at the intermediate node, it requires to perform a simulating scheduling procedure at the node, so as to calculate the handling time of the data flow at each intermediate node. As an example, referring to FIG. 3, three data flows of $f_1$, $f_2$ and $f_3$ have already been in the quasi-process list of a certain intermediate node, and it needs to calculate the expected handling time of the data flow $f_4$ at the intermediate node, then it only needs to temporally add $f_4$ into the quasi-process list of the intermediate node, and then the scheduling is performed according to the ranking of $f_1 \rightarrow f_4$ in the preference list $B_k$. In this example, assuming that the ranking order in $B_k$ is $f_1 > f_2 > f_3 > f_4$ and the resource demand is $q_1=10$, $q_2=5$, $q_3=8$, $q_4=6$, and assuming that the processing time $p_m$ of the data flow at the node is proportional to the resource demand $q_m$, and without loss of generality, let $p_m = q_m$ (m=1, 2, 3, 4). The total resource at the node is Q=18. when scheduling four data flows at this node, it can be determined that the expected queueing time of the data flow $f_4$ at the intermediate node is 10, and the expected handling time is 16.

Further, in order to realize more efficient resource allocation at the intermediate nodes, a bidirectional matching is performed between the data flows and the intermediate nodes. The bidirectional matching is an iterative procedure, especially, by repeating following step 1 and step 2.

At step 1, the preference list $A_m$ is generated. Each data flow applies to the first intermediate node in the preference list thereof. For each intermediate node, if x, the number of data flows applying to it, exceeds the service quota φ, i.e., x>φ, the intermediate node rejects the applications of the (x−φ) data flows beyond the service quota, and puts the (top x) data flows within the service quota into the quasi-service list. Then, the service quota of the intermediate node is added by 1. Otherwise, the x data flows are directly put into the quasi-service list.

At step 2, if each data flow is in the quasi-service list of a certain intermediate node, the iteration is stopped, and in this case, the quasi-service list of each intermediate node is the mapping relationship between the intermediate node and data flows. Otherwise, the iteration is continued.

On the other hand, with respect to the problem that which data flows should be given priority to process, the implementation of the present disclosure is for example as follows. If a certain intermediate node needs to provide service for more than one data flow, the data flows are sequentially scheduled according to the order of the data flows in the preference list $B_k$. The processing of the data flows at the intermediate node satisfies the resource constraint, that is, the total resource demand for processing the data flows simultaneously cannot exceed the available resource at the node.

Figure 4:
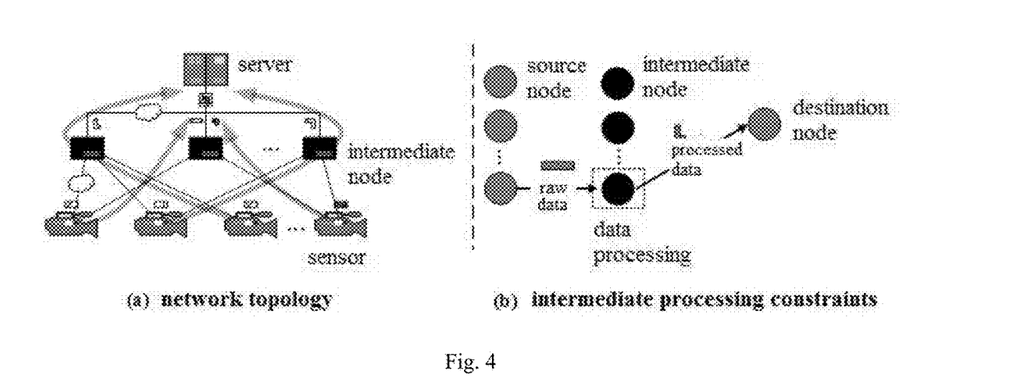
FIG. 4 is a schematic diagram illustrating network data processing under intermediate processing constraints according to an embodiment of the present disclosure.

The performance evaluation of embodiments of the present disclosure is conducted by following example. Referring to FIG. 4, an intelligent traffic system of a smart city is considered, in which there are 500 sensor nodes, and 10 intermediate nodes, i.e., |M|=500, |K|=10. Other parameters are randomly generated in a reasonable range, and totally 100 random network topologies are generated.

Figure 5:
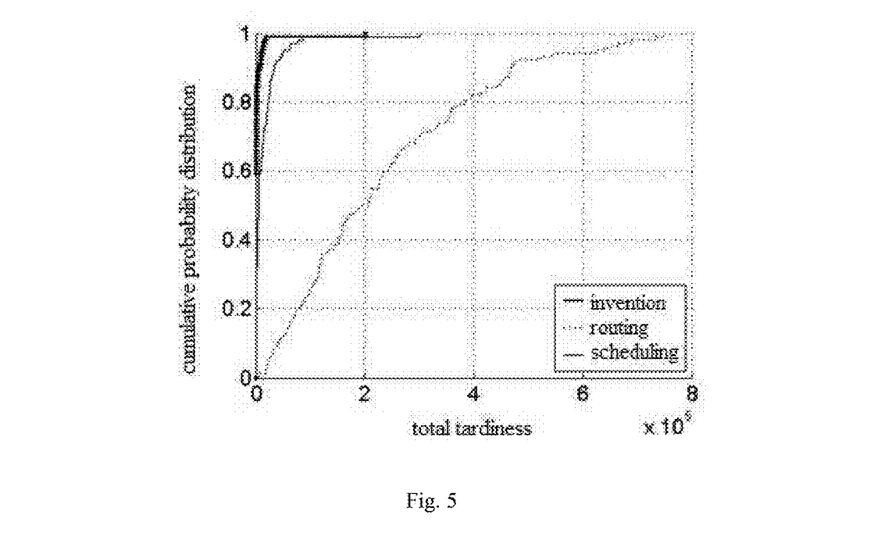
FIG. 5 is a schematic diagram illustrating a cumulative probability distribution of a total tardiness of all data flows according to an embodiment of the present disclosure.

Referring to FIG. 5, compared to the separate scheduling strategy and routing strategy, embodiments of the present disclosure can realize the minimum tardiness. In this example, the total tardiness can be 0 in 60% of instances, which means that 60% of applications can be completed in time.

Figure 6:
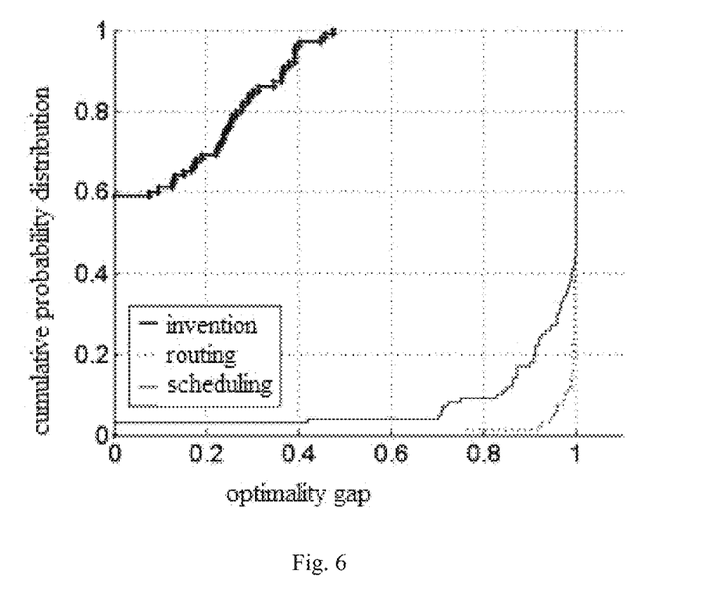
FIG. 6 is a schematic diagram illustrating a cumulative probability distribution of an optimality gap with respect to a lower bound of the problem according to an embodiment of the present disclosure.

In order to quantitatively evaluate the optimality of embodiments of the present disclosure, the optimality gap is defined for each instance I:

$$\mathrm{Gap}(I) = \frac{Z(I) - Z_{LB}(I)}{Z(I)}.$$

Where $Z(I)$ represents the objective function value of the instance I, and $Z_{LB}(I)$ represents the lower bound of this optimization problem. Referring to FIG. 6, in more than 90% of instances, the optimality gap is less than 0.4. However, with the separate scheduling strategy and the separate routing strategy, merely in 5% of the instances, the optimality gap is less than 0.4. This illustrates that, the result of embodiments of the present disclosure is very close to the lower bound of the problem, which can realize the performance close to the optimum.

Figure 7:
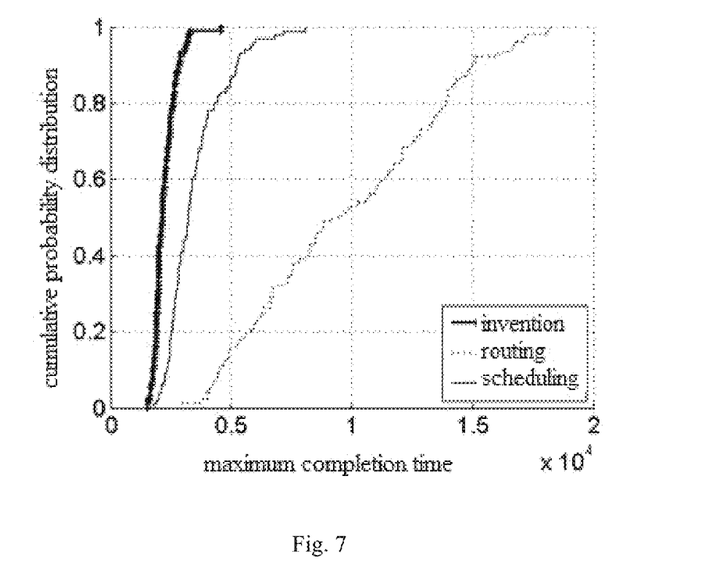
FIG. 7 is a schematic diagram illustrating a cumulative probability distribution of a maximum completion time of data flow according to an embodiment of the present disclosure.
Figure 8:
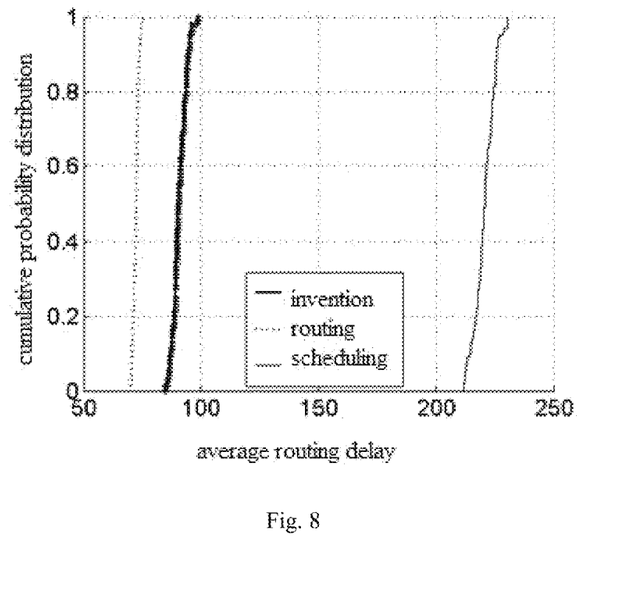
FIG. 8 is a schematic diagram illustrating a cumulative probability distribution of an average routing delay according to an embodiment of the present disclosure.

FIG. 7 is a schematic diagram illustrating a cumulative probability distribution of a maximum completion time. It can be seen from FIG. 7 that, embodiments of the present disclosure can realize the smallest maxim completion time. FIG. 8 is a schematic diagram illustrating a cumulative probability distribution of an average routing delay. It can be seen from FIG. 8 that, since the intermediate node having the shortest transmission path is allocated to the flow, the separate scheduling strategy realizes the shortest routing delay; however, since the separate scheduling strategy does not consider the length of the transmission path, the routing delay is uncontrollable.

In other words, embodiments of the present disclosure propose a optimization objective of minimizing the total tardiness of all the flows with respect to the resource allocation of the heterogeneous network under intermediate processing constraints. With trade-off between factors affecting the optimization objective, the methods for generating the preference lists with respect to the flow and the intermediate node are proposed. By the way of increasing the quota gradually, the bidirectional matching frame between the flows and the intermediate nodes is proposed. With the cyclic iteration of this frame, the optimized allocation of intermediate nodes is achieved. Finally, based on the node allocation, the flows are sequentially scheduled at the node. Thus, the present disclosure can achieve the optimization objective of low tardiness, and can obtain the resource allocation of the heterogeneous network close to optimum.

In conclusion, with the resource allocation method of a heterogeneous network under intermediate processing constraints according to embodiments of the present disclosure, based on the classical matching theory, by using the iterative mechanism increasing quota gradually, and according to mutual preference of flows and intermediate nodes, a bidirectional matching frame between flows and intermediate nodes is proposed, to achieve refusing of routing and scheduling. That is, a joint optimization is performed from two perspectives of scheduling and routing, to minimize delay of data intensive application, thus realizing low delay and high performance of the data intensive application under intermediate processing constraints, and achieving optimal resource allocation and optimal network performance. In addition, the present disclosure can be applied to a wide range of scenarios, such as smart city, smart factory, and cloud data center, and thus has a wide applicability.

It is to be understood that, in the description of the specification, orientation or position relationship indicated by terms such as "center", "longitudinal", "lateral", "length", "width", "thickness", "up", "down", "front", "rear", "left", "right", "vertical", "horizontal", "top", "bottom", "inside", "outside", "clockwise", "anticlockwise", "axial", "radial" and "circumferential" is the orientation or position relationship illustrated based on drawings, and are only used to simplify description of the present invention, and do not indicate or imply that the device or element referred to must have or operated in a particular orientation. They cannot be seen as limits to the present disclosure.

Moreover, terms of "a first" and "a second" are only used for description and cannot be seen as indicating or implying relative importance or implying the number of technical features referred to. Thus, a feature defined with "a first" and "a second" may indicate or imply including at least one the feature. In the description of the specification, "a plurality of" means more than two, for example, two, three, and the like, unless otherwise stipulated and restricted.

In the present disclosure, unless otherwise stipulated and restricted, it is to be explained that terms of "installation", "linkage", "connection" and "fixation" shall be understood broadly, for example, it could be permanent connection, removable connection or integral connection; it could be mechanical connection, or electrical connection; it could be direct linkage, indirect linkage via intermediate medium, inside linkage within two elements or interactive relationship of two elements. Those of ordinary skill in the art shall understand the concrete notations of the terms mentioned above according to specific circumstances.

In the present disclosure, unless otherwise stipulated and restricted, the first feature being "on" or "below" the second feature may be the first feature being in direct contact with the second feature, or the first feature being in indirect contact with the second feature via intermediate medium. Moreover, the first feature being "on", "over" or "above" the second feature may be the first feature being exactly or inclinedly above the second feature, or merely indicates that the horizontal height of the first feature is higher than that of the second feature. The first feature "below", "under" or "underneath" the second feature may be the first feature being exactly or inclinedly below the second feature, or merely indicates that the horizontal height of the first feature is less than that of the second feature.

Reference throughout this specification to "an embodiment", "some embodiments", "one schematic embodiment", "an example", "a specific examples", or "some examples" means that a particular feature, structure, material, or characteristic described in connection with the embodiment or example is included in at least one embodiment or example of the disclosure. Thus, the appearances of the phrases such as "in some embodiments", "in one embodiment", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be understood that above embodiment are exemplary, and shall not be understood as limitation to the present disclosure, and it would be appreciated by those skilled in the art that changes, alternatives, and modifications may be made in the embodiments within the scope of the disclosure.

What is claimed is:

1. A resource allocation method of a heterogeneous network under intermediate processing constraints, comprising:

S1: obtaining a deadline and a required resource amount of each data flow, setting a corresponding evaluation score for each data flow according to the deadline and the required resource amount of the data flow, and ranking the data flows according to the evaluation scores, to generate a preference list for each intermediate node;

S2: obtaining network topology information of the heterogeneous network, and calculating a length of a transmission path of the data flow passing through the intermediate node according to the network topology information;

S3: initializing a service quota of each intermediate node to be 1, and performing a bidirectional matching between the data flows and the intermediate nodes, to obtain a quasi-service list of each intermediate node;

S4: obtaining a mapping relationship between the intermediate nodes and the data flows according to the quasi-service list of each intermediate node, and sequentially scheduling the data flows according to the mapping relationship and the preference list of each intermediate node.

2. The method according to claim 1, wherein S2 comprises:

calculating a shortest path length between a source node of each data flow and the intermediate node and a shortest path length between the intermediate node and a destination node of each data flow according to the network topology information; and obtaining the length of the transmission path of each data flow through the intermediate node according to the shortest path length between its source node and the intermediate node and the shortest path length between the intermediate node and its destination node.

3. The method according to claim 2, wherein the length of the transmission path of the intermediate node is equal to a sum of the shortest path length between source nodes of the data flows and the intermediate node and the shortest path length between the intermediate node and destination nodes of the data flows.

4. The method according to claim 1, wherein S3 comprises:

S31: ranking the intermediate nodes, to generate a preference list for each data flow;

S32: applying by each data flow to the first intermediate node in the preference list thereof; and S33: determining by each intermediate node, whether the number of data flows applying to the intermediate node exceeds the service quota of the intermediate node, if yes, rejecting the application of the data flows beyond the service quota according to the preference list of the intermediate node, adding the data flows within the service quota into the quasi-service list, and adding one to the service quota of the intermediate node.

5. The method according to claim 4, after S33, further comprising:

S34: if all the data flows are in the quasi-service lists of the intermediate nodes, executing S4, otherwise, executing S31.

6. The method according to claim 4, wherein S33 further comprises:

if the intermediate node determines that the number of data flows applying to the intermediate node does not exceed the service quota of the intermediate node, directly adding the data flows into the quasi-service list of the intermediate node.

7. The method according to claim 4, wherein S31 comprises:

S311: calculating an expected handling time of each data flow at each intermediate node according to the preference list of each intermediate node and the current quasi-process list of each intermediate node;

S312: setting an evaluation score for each intermediate node according to the expected handling time and the length of the transmission path of the data flow through the intermediate node, and ranking the intermediate nodes according to the evaluation scores, to generate the preference list for each data flow.

8. The method according to claim 7, wherein S311 comprises:

S3111: determining whether a data flow is in the quasi-process list of the intermediate node;

S3112: if there the data flow is not in the quasi-process list of the intermediate node, adding the data flow into the quasi-process list of the intermediate node;

S3113: obtaining a scheduling order of the data flow at the intermediate node according to the preference list of the intermediate node, and calculating a processing time and an expected queueing time of the data flow, and obtaining the expected handling time of the data flow according to the processing time and expected queueing time of the data flow.

9. The method according to claim 8, wherein the expected handling time of the data flow is a sum of the processing time and the expected queueing time of the data flow.

10. A device for resource allocation of a heterogeneous network under intermediate processing constraints, comprising:

one or more processors;

a memory;

one or more programs, stored in the memory, and configured to perform the resource allocation method of a heterogeneous network under intermediate processing constraints when executed by the one or more processors, the method comprising:

S1: obtaining a deadline and a required resource amount of each data flow, setting a corresponding evaluation score for each data flow according to the deadline and the required resource amount of the data flow, and ranking the data flows according to the evaluation scores, to generate a preference list for each intermediate node;

S2: obtaining network topology information of the heterogeneous network, and calculating a length of a transmission path of the data flow passing through the intermediate node according to the network topology information;

S3: initializing a service quota of each intermediate node to be 1, and performing a bidirectional matching between the data flows and the intermediate nodes, to obtain a quasi-service list of each intermediate node;

S4: obtaining a mapping relationship between the intermediate nodes and the data flows according to the quasi-service list of each intermediate node, and sequentially scheduling the data flows according to the mapping relationship and the preference list of each intermediate node.

11. A non-transitory computer storage medium, stored therein with one or more programs that, when executed by a device, causes the device to perform the resource allocation method of a heterogeneous network under intermediate processing constraints, the method comprising:

S1: obtaining a deadline and a required resource amount of each data flow, setting a corresponding evaluation score for each data flow according to the deadline and the required resource amount of the data flow, and ranking the data flows according to the evaluation scores, to generate a preference list for each intermediate node;

S2: obtaining network topology information of the heterogeneous network, and calculating a length of a transmission path of the data flow passing through the intermediate node according to the network topology information;

S3: initializing a service quota of each intermediate node to be 1, and performing a bidirectional matching between the data flows and the intermediate nodes, to obtain a quasi-service list of each intermediate node;

S4: obtaining a mapping relationship between the intermediate nodes and the data flows according to the quasi-service list of each intermediate node, and sequentially scheduling the data flows according to the mapping relationship and the preference list of each intermediate node.

12. The device according to claim 10, wherein S2 comprises:

calculating a shortest path length between a source node of each data flow and the intermediate node and a shortest path length between the intermediate node and a destination node of each data flow according to the network topology information; and obtaining the length of the transmission path of each data flow through the intermediate node according to the shortest path length between its source node and the intermediate node and the shortest path length between the intermediate node and its destination node.

13. The device according to claim 12, wherein the length of the transmission path of the intermediate node is equal to a sum of the shortest path length between source nodes of the data flows and the intermediate node and the shortest path length between the intermediate node and destination nodes of the data flows.

14. The device according to claim 10, wherein S3 comprises:

S31: ranking the intermediate nodes, to generate a preference list for each data flow;

S32: applying by each data flow to the first intermediate node in the preference list thereof; and S33: determining by each intermediate node, whether the number of data flows applying to the intermediate node exceeds the service quota of the intermediate node, if yes, rejecting the application of the data flows beyond the service quota according to the preference list of the intermediate node, adding the data flows within the service quota into the quasi-service list, and adding one to the service quota of the intermediate node.

15. The device according to claim 14, after S33, further comprising:

S34: if all the data flows are in the quasi-service lists of the intermediate nodes, executing S4, otherwise, executing S31.

16. The device according to claim 14, wherein S33 further comprises:

if the intermediate node determines that the number of data flows applying to the intermediate node does not exceed the service quota of the intermediate node, directly adding the data flows into the quasi-service list of the intermediate node.

17. The device according to claim 14, wherein S31 comprises:

S311: calculating an expected handling time of each data flow at each intermediate node according to the preference list of each intermediate node and the current quasi-process list of each intermediate node;

S312: setting an evaluation score for each intermediate node according to the expected handling time and the length of the transmission path of the data flow through the intermediate node, and ranking the intermediate nodes according to the evaluation scores, to generate the preference list for each data flow.

18. The device according to claim 17, wherein S311 comprises:

S3111: determining whether a data flow is in the quasi-process list of the intermediate node;

S3112: if there the data flow is not in the quasi-process list of the intermediate node, adding the data flow into the quasi-process list of the intermediate node;

S3113: obtaining a scheduling order of the data flow at the intermediate node according to the preference list of the intermediate node, and calculating a processing time and an expected queueing time of the data flow, and obtaining the expected handling time of the data flow according to the processing time and expected queueing time of the data flow.

19. The device according to claim 18, wherein the expected handling time of the data flow is a sum of the processing time and the expected queueing time of the data flow.

* * * * *